E. E. ENGLUND.
CHECKROW CORN PLANTER.
APPLICATION FILED OCT. 17, 1921.
1,432,987.
Patented Oct. 24, 1922.
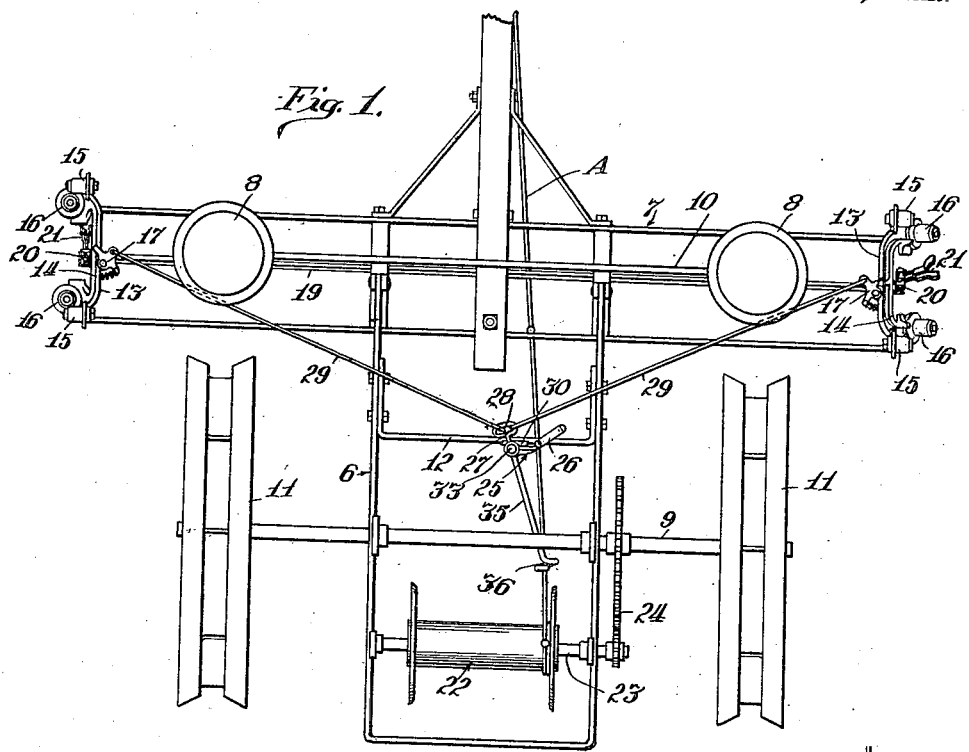
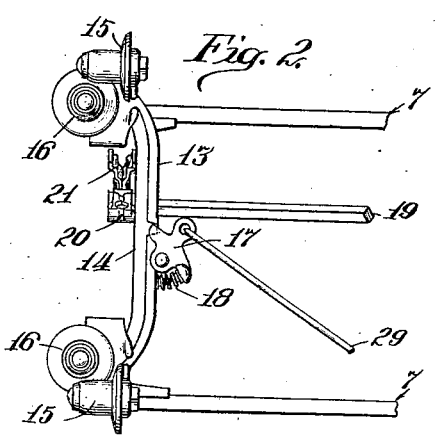
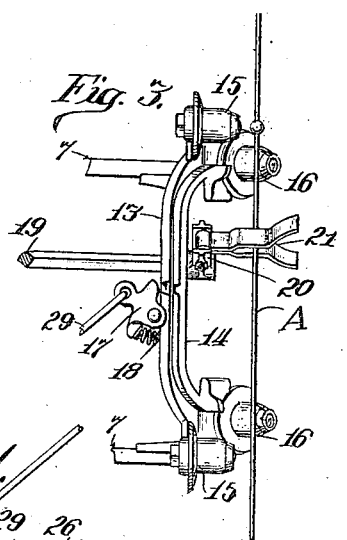
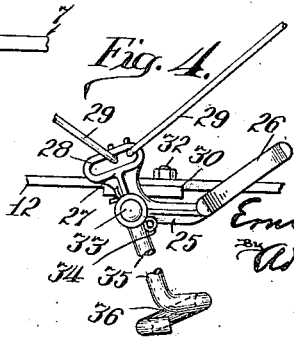
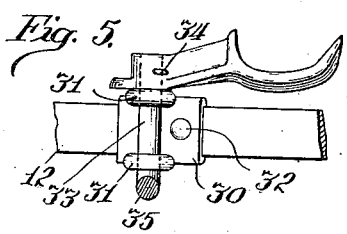

Patented Oct. 24, 1922.

1,432,987

UNITED STATES PATENT OFFICE.

ERNST E. ENGLUND, OF MOLINE, ILLINOIS, ASSIGNOR TO D. M. SECHLER IMPLEMENT & CARRIAGE COMPANY, OF MOLINE, ILLINOIS, A CORPORATION OF ILLINOIS.

CHECKROW CORN PLANTER.

Application filed October 17, 1921. Serial No. 508,364.

*To all whom it may concern:*

Be it known that I, ERNST E. ENGLUND, a citizen of the United States, and a resident of Moline, in the county of Rock Island and State of Illinois, have invented certain new and useful Improvements in Checkrow Corn Planters, of which the following is a specification, reference being had to the accompanying drawings.

This invention relates to check-row corn planters of the well-known type having a front and rear frame suitably connected together. In the use of planters of this type, when the end of a field has been reached or when the planting is finished it is necessary to release the check row wire from the check row head and fork of the planter and remove it therefrom, and after a field has been planted the wire is connected to and wound upon a drum which is rotatably mounted near the rear end portion of the rear frame of the planter, as is usual in machines of this type. It has been the usual practice to provide two foot levers, one at each side of the driver's seat whereby the check row wire could be released by the operator from one side or the other, as desired, by operating the foot lever at the side of the machine in which the wire has been operating. It has also been the practice to provide a hand lever by which the operator could guide the check row wire from one side to the other of the reel or drum while it was being wound up thereon.

It is the object of my present invention to materially simplify this construction by providing a single foot lever, by the use of which the check row wire can be released from the check row head and fork at either side of the machine as desired, thus doing away with one of the foot levers; also to provide means connected with this same foot lever whereby the guiding of the wire when winding it up on the reel or drum may be accomplished by the use of this same foot lever, thus leaving both hands of the operator free for the purpose of handling the team and operating the main lifting lever of the planter. I accomplish these objects as illustrated in the accompanying drawings and hereinafter described. What I regard as new is set forth in the claims.

In the drawings,—

Fig. 1 is a plan view of a planter provided with my improvements, only such parts of the planter being shown as are necessary to a complete understanding of my invention;

Fig. 2 is an enlarged detail of the left hand check row head and check fork when in operative position, the frame bars and rock shaft being broken away;

Fig. 3 is an enlarged detail of the right hand check row head after the hinged or movable member thereof has been released and has dropped down into open or inoperative position, and showing the check row wire partly released therefrom and in position to be removed by the operator, the frame bars and rock shaft being broken away;

Fig. 4 is an enlarged detail of the operating lever shown in Fig. 1, the planter frame bar on which it is mounted being broken away; and Fig. 5 is an enlarged rear view of the operating lever, showing the bracket by means of which it is mounted on the frame bar.

Referring to the several figures of the drawings,—the rear or main frame of the corn planter is indicated by the numeral 6 and is of the ordinary construction and approximately rectangular in shape as usual, and at its front end is connected in any ordinary manner with the front frame 7, on which latter frame are supported seed boxes 8 that will be provided with the usual seed measuring and discharging devices in their lower ends. 9 indicates the axle of the machine upon which the main frame 6 is mounted, and from which a shaft 10 that is connected with the seed discharging mechanism in the bottoms of the seed boxes is driven in the usual manner. The supporting wheels of the machine that are secured upon the axle 9 are indicated by 11. The rear frame brace of the planter is indicated by the numeral 12.

The front frame 7 of the planter is provided at each end with the usual check row head, the stationary member of which is indicated by the numeral 13, and the hinged or outwardly and downwardly swinging member thereof by the numeral 14. The hinged member 14 is pivotally connected at each of its ends with the stationary member of the head, but it has not been thought necessary to illustrate this pivotal connection of the two parts of the head because the construction is old and will be readily understood by those skilled in the art. Pivotally mounted on each end of the stationary member 13 of the head is the usual guide roller 15. These guide rollers extend outwardly at a right angle to the body portion of the stationary member. Pivotally mounted on each end of the swinging member 14 of the head is the usual guide roller 16, and these guide rollers are so positioned that they extend upwardly from the swinging member 14 and at a right angle to the rollers 15. The object of these guide rollers is to guide the check row wire, as will be readily understood. Mounted on each of the stationary members 13 of the check row head is an ordinary spring-controlled latch 17 for holding the stationary and swinging members of the head locked together in operative position, the spring being indicated by the numeral 18.

The rock shaft is indicated by 19, and suitably connected to each end of such rock shaft in the usual manner is a check row fork which is adapted to turn the rock shaft in the usual manner during the operation of the machine. This check row fork comprises an arm 20 which is rigidly connected with the rock shaft 19 and a fork portion 21 which is pivotally connected to the arm 20 to adapt it to swing outwardly and downwardly from operative position, as illustrated in Fig. 3. In Fig. 2 I have illustrated the parts of the check row head and check row fork when locked in operative position, and in Fig. 3 I have illustrated the parts in the position they will assume after the latch has been released and the swinging member of the head and the swinging member of the fork have dropped down, and showing also the check row wire, indicated by the letter A, partly released from between the guide rollers 15 and 16 and ready to be withdrawn from the fork portion 21 by the operator.

The reel or drum upon which the check row wire is wound when the planting has been completed is indicated by 22. It is rotatably mounted in the frame 6 near the rear portion thereof by means of a shaft 23. Said shaft may be driven in any suitable way, as by means of a chain 24 passing around a sprocket wheel mounted on one end of the shaft 23 and a sprocket wheel mounted on the axle 9 of the planter. The parts thus far described are well-known and old in the art, and it is thought that the brief description thereof hereinabove given will be sufficient for a complete understanding of my present invention.

Coming now to the novel features of my present invention, 25 indicates a foot lever pivotally connected as hereinafter described to the rear frame brace 12 of the planter. This foot lever is bent in the form shown so as to provide a laterally-extending foot engaging portion 26 at one end. The forward end portion of the foot lever, indicated by 27, has formed therein, near its outer end, an elongated opening or slot 28 extending transversely of the body portion 27 of that end of the lever. Two long links or rods 29 are indicated by the numeral 29. Each is connected at one of its ends with the portion 27 of the lever so as to have a sliding engagement in the slot 28. One of these links 29 extends forwardly and outwardly and has its opposite end connected with the latch on the stationary member of the right hand check row head, and the other link 29 extends forwardly and outwardly and has its opposite end connected with the latch on the stationary member of the other check row head, as shown in Fig. 1.

30 indicates a bracket secured in any suitable manner, as by a bolt 32, to the cross-bar 12, and provided with apertured ears 31, in which is rotatably mounted the upturned end 33 of a long rod 35 that extends rearwardly and terminates in an eye 36. The lever 25 is made fast to the end portion of the upturned member 33 of the rod 35 by any suitable means, as for example, by a cotter pin 34, as shown. The rod 35 is provided for the purpose of guiding the check row wire A while it is being wound up on the reel or drum 22, as hereinafter explained in describing the operation of the device.

The operation of my improved machine is as follows: With the check row wire operating in the check row head at the right hand side of the machine, when the end of the field has been reached or the planting has been completed and it is desired to disengage the check row wire from between the guide rollers of the check row head and from the check row fork at that side of the machine the operator will push forward on the foot lever 25 throwing the end 27 of the lever, which has the elongated slot, to the left, thereby moving the long link 29 that is connected with the right hand check row latch rearwardly and to the left thus pulling the latch 17 that such right hand link is connected with against the action of its spring 18 so as to disengage such latch from the hinged member 14 of the said right hand check row head. Such hinged member 14 will therefore swing outwardly and downwardly on its pivots under its own weight, thereby releasing the wire from between the guide rollers 15 and 16 at both ends of the head. As the hinged portion 14 of the head swings outwardly it strikes the pivoted fork portion 21 of the check row fork, compelling it to swing outwardly and downwardly so that the check row wire may easily be slid out from the part 21 by the operator. Figs. 3 and 4 taken together show the position of the parts after the foot lever has been operated to release the check row wire from the check row head and fork at the right hand side of the machine, and Fig. 3 also shows the wire in position to be removed from the fork. It will be readily seen that by providing the elongated slot 28 there is sufficient play for the rods 29 so that when the right hand rod 29 is pulled by the forward push on the foot lever the left hand rod 29 will slide in such slot 28 and will not be affected by this operation, and consequently will cause no movement of the latch that it is connected with. When it is desired to release a wire from the devices at the left hand side of the machine a backward push on the foot lever 25 will move the member 27 of the foot lever to the right, thereby pulling the left hand link 29, releasing the latch on the left hand check row head and allowing the hinged member of the check row head and the check row fork to drop down into inoperative position, the same as has been described with reference to the devices on the right hand side of the machine.

When it is desired to use the lever 25 for the purpose of guiding the check row wire while it is being wound on the reel or drum 22 after it has been removed from the check row head and fork at either side of the machine, the end of the wire is run through the eye 36 at the rear end of the rod 35 and is then fastened to the drum at one side thereof, as illustrated in the drawings. As the machine moves forward the drum is rotated in the usual manner by means of the sprocket wheels and chain 24 as above described, and as the wire is wound on the drum the operator swings the foot lever 25 thereby swinging the guide rod 35, which is securely connected with the foot lever 25 as above described, and of course causing the wire to be wound evenly on the drum in the usual manner, layer after layer.

What I claim as my invention and desire to secure by Letters Patent, is—

1. In a planter, the combination of two check row heads each comprising a stationary member and a pivoted member, a lever, and means connecting said lever with said two pivoted members, said means being adapted to release one of said pivoted members from operative engagement with its adjacent stationary member when the lever is swung in one direction and to release the other pivoted member from operative engagement with its adjacent stationary member when the lever is swung in the opposite direction.

2. In a planter, the combination of two check-row heads each comprising a pivoted member, a latch for each head for locking the pivoted member thereof in operative position, a lever, and means connecting said lever with said two latches adapted to move one of said latches out of locking position when the lever is swung in one direction and to correspondingly move the other latch when the lever is swung in the opposite direction.

3. In a planter, the combination of two check row heads each comprising a stationary member and a pivoted member, a latch on each head for holding the two members thereof together, two links connected respectively with the said latches, and a laterally-swinging pivoted lever with which each of said links is slidingly connected.

4. In a planter, the combination of two check row heads each comprising a pivoted member, a lever pivotally mounted intermediate its ends, one end portion of which lever constitutes a foot-engaging part and the other end portion being provided with an elongated slot, and a pair of links separately connecting the pivoted members with said elongated slot and having a sliding engagement in said slot, one of said links moving to release its pivoted member when the lever is moved in one direction and the other link moving to release its pivoted member when the lever is moved in the opposite direction.

ERNST E. ENGLUND.